United States Patent [19]

Rozelle et al.

[11] Patent Number: 4,922,757
[45] Date of Patent: May 8, 1990

[54] APPARATUS FOR PRECISE DETECTION OF BLADE PASSING TIMES IN A STEAM TURBINE

[75] Inventors: Paul F. Rozelle, Fern Park, Fla.; Karl C. Koch, Swissvale; Charles W. Einolf, Jr.; Robert M. Oates, both of Murrysville, all of Pa.

[73] Assignee: Westinghouse Electric Corp., Pittsburgh, Pa.

[21] Appl. No.: 205,770

[22] Filed: Jun. 13, 1988

[51] Int. Cl.5 .................. G01H 11/02; G01M 1/22; G01P 3/488; H03K 5/153
[52] U.S. Cl. .................................. 73/660; 73/661; 307/354; 307/358; 307/510; 307/515; 324/173; 324/207.13; 324/207.22; 328/110; 328/165; 416/61
[58] Field of Search ............... 324/163, 164, 166, 173, 324/174, 207, 208, 78 R, 78 D, 82; 307/354, 358, 510, 511, 515, 520; 328/109, 110, 140, 165; 73/660, 661; 340/683; 416/61

[56] References Cited

U.S. PATENT DOCUMENTS

| | | |
|---|---|---|
| 3,222,454 | 12/1965 | Losee .................. 324/78 D UX |
| 3,505,537 | 4/1970 | Giordano ........................ 307/362 |
| 3,932,813 | 1/1976 | Gallant ......................... 324/173 X |
| 3,944,936 | 3/1976 | Pryor .......................... 307/354 X |
| 4,013,967 | 3/1977 | Fassbind ....................... 328/140 X |
| 4,518,917 | 5/1985 | Oates ............................. 73/660 X |
| 4,573,358 | 3/1986 | Luongo ............................. 73/660 |
| 4,593,566 | 6/1986 | Ellis ................................. 73/660 |
| 4,605,889 | 8/1986 | Luneau ......................... 324/163 X |
| 4,609,869 | 9/1986 | Metcalf ......................... 307/354 X |

Primary Examiner—Gerard R. Strecker

[57] ABSTRACT

An apparatus for detecting blade passing times includes a sensor for producing an input signal each time a blade passes the sensor. A zero crossing detector produces an output signal each time the input signal crosses a reference axis. A phase shifter shifts the phase of the input signal to produce a gating signal coinciding with the expected arrival time of the blade at the sensor. A gating device is responsive to the gating signal for conducting output signals which occur during the expected arrival time of the blade at the sensor.

7 Claims, 2 Drawing Sheets

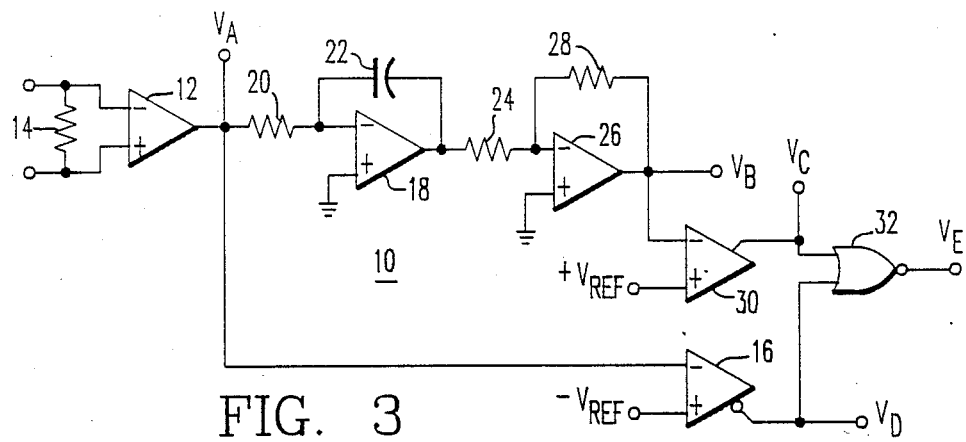
FIG. 3
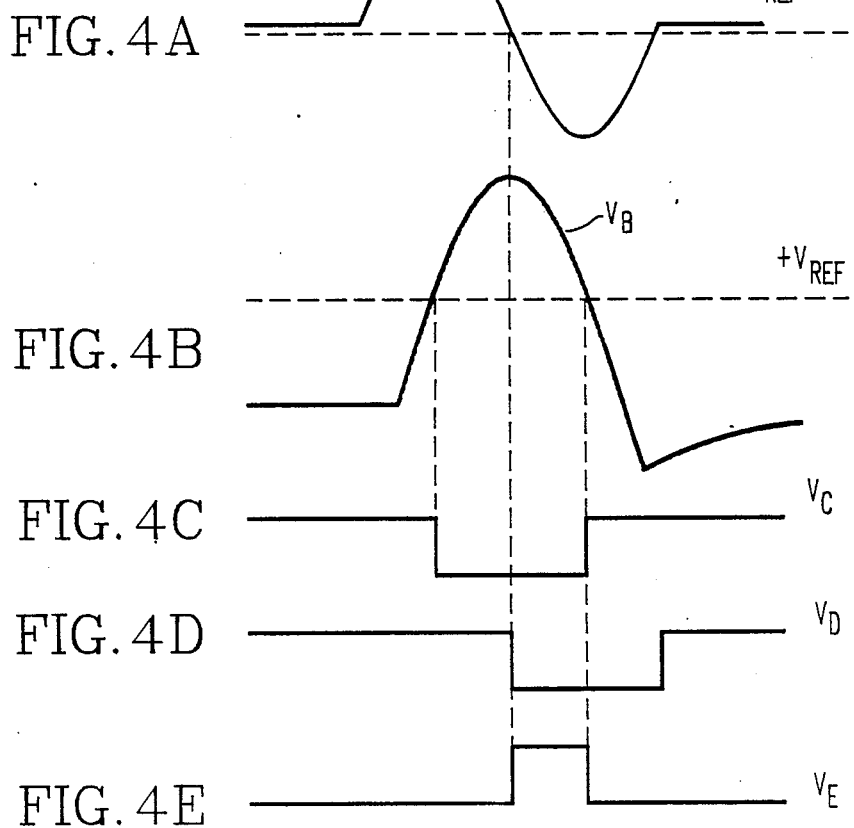
FIG. 4A
FIG. 4B
FIG. 4C
FIG. 4D
FIG. 4E

APPARATUS FOR PRECISE DETECTION OF BLADE PASSING TIMES IN A STEAM TURBINE

BACKGROUND OF THE INVENTION

1. Field of the Invention:

The present invention is directed generally to sensors and more particularly to sensors used to detect vibrations in rotary machines.

2. Description of the Prior Art:

Historically, the vibrational modes of steam turbine blades have been measured by placing strain gages on the rotating blades and telemetering the information to a stationary receiver. That method is not very desirable because the gages have short lives. It is also necessary to mount a strain gage on each blade which is to be monitored. For those reasons other types of sensors have been investigated.

In U.S. Pat. No. 4,593,566 a capacitive type of sensor is disclosed. As each blade tip passes the sensor, there is a capacitance change in the capacitor defined by the sensor and the blade. This results in small currents flowing into and out of the thus defined capacitor. Those current signals are passed through two threshold detectors. The first, a variable positive level comparator, gates a second close-to-zero level comparator. This allows precise timing through the zero-crossing when the signal-to-noise ratio is high but inhibits the zero crossing comparator during periods when a blade tip is not adjacent a sensor and the signal-to-noise ratio is zero.

Variable capacitance sensors, although inherently fast and rugged, do not give usable results in two-phase flow. Changes in capacitance due to flow induced changes in dielectric properties can cause spurious results.

Optical sensors have been used for blade vibration monitor applications. However, optical sensors are not suitable for long term installation in an operating steam turbine environment because of poor performance in steam containing droplets, refraction effects of surface water, erosion, and contamination of the optical surfaces by oxides and other particles.

Self-generating types of sensors, such as magnetic sensors, have also been investigated. The precision of timing necessary for measuring significant vibration is on the order of forty nanoseconds, which implies a clock frequency of twenty-five megahertz. Nominal response frequencies of magnetic sensors and amplifier circuits are typically less than twenty-five kilohertz. That discrepancy of three orders of magnitude in performance has discouraged the use of such sensors. Accordingly, the need exists for an apparatus capable of precisely detecting the passing of the blades of a rotating machine past a stationary sensor.

SUMMARY OF THE INVENTION

The present invention is directed to an apparatus for detecting the passing of the blades of a rotating machine past a stationary sensor. The sensor produces an input signal each time a blade passes the sensor. A zero crossing detector produces an output signal each time the input signal crosses a reference axis. A phase shifter shifts the phase of the input signal to produce a gating signal coinciding with the expected arrival time of the blade at the sensor. A gating device is responsive to the gating signal for conducting output signals which occur during the expected arrival time of the blade at the sensor.

The present invention is also directed to a method of detecting the passing of the blades of a rotating machine past a stationary sensor. The method includes the steps of producing an input signal each time a blade passes a stationary sensor. An output signal is produced each time the input signal crosses a reference axis. The input signal is phase shifted to produce a phase-shifted input signal. The phase-shifted input signal is compared to a reference signal to produce a gating signal which coincides with the expected arrival time of the blade at the sensor. The output signal is selectively conducted in response to the gating signal.

The present invention contemplates the use of magnetic sensors. Such sensors are simple and rugged. When used with the circuitry of the present invention they provide good results. Such sensors are well suited to the adverse environments found in turbomachinery. These and other advantages and benefits of the present invention will become apparent from a description of a preferred embodiment hereinbelow.

BRIEF DESCRIPTION OF THE DRAWINGS

In order for the present invention to be easily understood and readily practiced, a preferred embodiment will be described, by way of example only, in conjunction with the FIGS. wherein:

FIG. 3 illustrates a circuit constructed according to the teachings of the present invention for processing the signals produced by the magnetic sensor;

FIGS. 4A–4E illustrate various signals useful in explaining the operation of the circuit shown in FIG. 3.

DESCRIPTION OF THE PREFERRED EMBODIMENT

Other investigators have neglected simple, self-generating sensors, such as magnetic sensors, because of the apparently poor frequency response of the sensors. The present inventors have recognized, however, that frequency response is of little importance so long as it is high enough to prevent interaction of the signals generated from adjacent blades. The present inventors have conducted laboratory experiments to verify that magnetic sensors, when used in combination with the circuitry of the present invention, have sufficient response to avoid such interaction between the signals generated by adjacent blades.

Figure 1A:
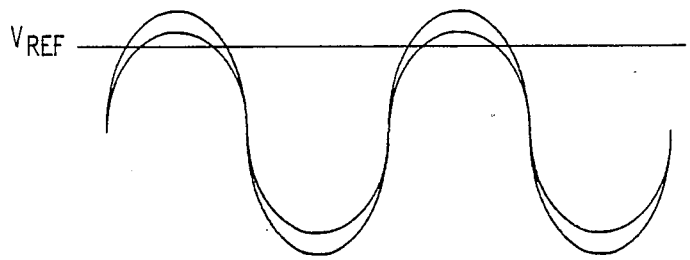
FIGS. 1A, 1B, 1C, and 1D illustrate, respectively, amplitude variations in an input signal, leading edge comparator output for large amplitude input signal, leading edge comparator output for small amplitude input signal, and the time shift due to amplitude sensitivity.
Figure 1B:
Figure 1C:
Figure 1D:

One difficulty encountered when using magnetic sensors arises from the fact that the output voltage of the sensor is proportional to the rate of change of the magnetic flux. The magnitude of the flux is affected by sensor-to-blade spacing, and the rate of change is proportional to blade tip velocity. FIG. 1A illustrates amplitude variations in an output signal produced by a magnetic sensor. FIG. 1A also illustrates a comparator input threshold trip voltage $V_{REF}$. In FIG. 1B, the output signal of a comparator is illustrated assuming that the larger amplitude signal is input to the comparator. In FIG. 1C the output of the comparator is illustrated assuming that the smaller amplitude signal is input to the comparator. FIG. 1D illustrates the apparent time shift due to this amplitude sensitivity.

Figure 2A:
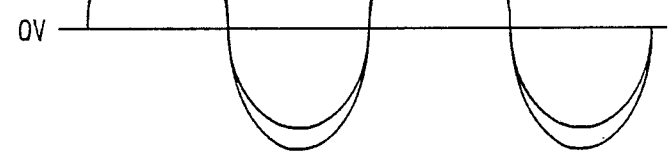
FIGS. 2A and 2B illustrate, respectively, amplitude variations in an input signal and leading edge comparator output for a threshold trip value of zero volts.
Figure 2B:
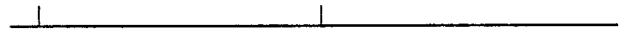

The way to minimize the effects of spacing and velocity is to detect each signal at the zero-cross point. A zero-crossing detector is insensitive to the pulse amplitude and therefore is insensitive to the effects of spacing and velocity. This insensitivity is illustrated in FIGS. 2A and 2B. As can be seen in FIG. 2B, which is the output of the comparator, regardless of the variations in amplitude of the input signal shown in FIG. 2A, the zero crossing points remain the same.

The present inventors have discovered that a simple zero-crossing detector is inadequate because it triggers erratically in the presence of noise. Small variations in voltage will cause triggering between blade passing times. For proper performance of a vibration monitoring system, it is necessary to have one and only one pulse generated, in a repeatable fashion, for each blade passing event. A true zero-crossing detector 10 constructed according to the teachings of the present invention, is illustrated in FIG. 3.

Figure 5:
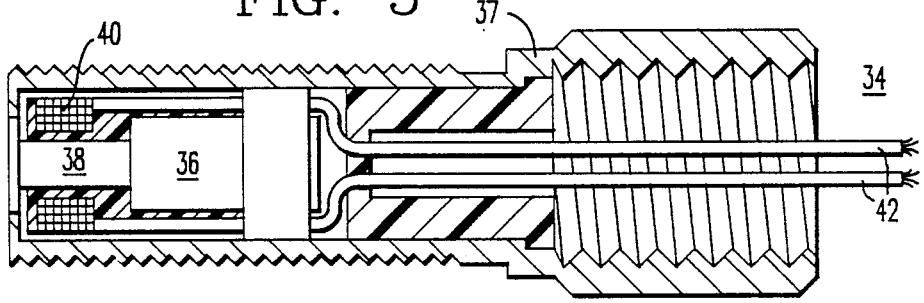
FIG. 5 illustrates a typical magnetic sensor.

In FIG. 3, a signal generated by a magnetic sensor, such as shown in FIG. 5, is input across an inverting and a noninverting input terminal of an operational amplifier 12. An impedance matching resistor 14 is also connected across the inverting and noninverting input terminals of the operational amplifier 12. A voltage $V_A$ is available at an output terminal of the operational amplifier 12.

The voltage $V_A$ is input to an inverting input terminal of an operational amplifier 16. A noninverting input terminal of the operational amplifier 16 receives a reference signal $-V_{REF}$. An output voltage $V_D$ is available at an output terminal of the operational amplifier 16.

The voltage $V_A$ is also input to an inverting input terminal of an operational amplifier 18 through a resistor 20. A noninverting input terminal of the operational amplifier is connected to ground. An output terminal of the operational amplifier 18 is connected to the inverting input terminal through a capacitor 22.

The output terminal of the operational amplifier 18 is connected through a resistor 24 to an inverting input terminal of an operational amplifier 26. A noninverting input terminal of the operational amplifier 26 is connected to ground. An output terminal of the operational amplifier 26 is connected to the inverting input terminal thereof through a resistor 28. A voltage $V_B$ is available at the output terminal of the operational amplifier 26.

The voltage $V_B$ is input to an inverting input terminal of an operational amplifier 30. A positive reference voltage $V_{REF}$ is input to a noninverting input terminal of the operational amplifier 30. A voltage $V_C$ is available at an output terminal of the operational amplifier 30.

A NOR gate 32 receives the signal $V_C$ at a first input terminal thereof and the signal $V_D$ at a second input terminal thereof. An output voltage $V_E$ is available at an output terminal of the NOR gate 32.

In operation, the input signal $V_A$ is compared by operational amplifier 16 to the reference voltage $-V_{REF}$. The operational amplifier acts as a zero-crossing comparator to produce an output pulse $V_D$ shown in FIG. 4D, each time the input signal $V_A$ crosses a reference axis established by the reference voltage as shown in FIG. 4A. The output pulse $V_D$ is input to the NOR gate 32.

The input signal $V_A$ is phase shifted by the operational amplifier 18 by, for example, ninety degrees to produce a phase-shifted input signal which is amplified by operational amplifier 26. The phase-shifted, amplified input signal $V_B$ is shown in FIG. 4B. The signal $V_B$ is input to the operational amplifier 30 where it is compared to the positive reference signal $V_{REF}$ as shown in FIG. 4B. The result of that comparison is a gating signal which is the voltage $V_C$ shown in FIG. 4C. The gating signal is also input to the NOR gate 32. The NOR gate, upon receiving the signals shown in FIGS. 4C and 4D produces an output pulse $V_E$ as shown in FIG. 4E.

Through the circuit 10, the input signal $V_A$ is used to not only produce the pulses $V_D$ but is also used to produce the gating signal which, because it is produced from the input signal, coincides with the expected arrival time of the blade at the sensor. The gating signal has a pulse width whose duration spans the expected arrival time of the blade at the sensor. The gating signal is then used to control the transmission of the pulses $V_D$ through the NOR gate 32. Thus, the NOR gate 32 only conducts those signals $V_D$ which occur during the expected arrival time of the blade at the sensor. Spurious pulses produced by the operational amplifier 16 are not conducted through the NOR gate 32. Through the circuit 10 shown in FIG. 3, the effects of noise are eliminated and one and only one pulse $V_E$ is produced each time a blade passes the stationary magnetic sensor. The circuit 10 shown in FIG. 3 also eliminates distance and velocity effects. The signal $V_E$ output by the NOR gate 32 is input to processing circuitry (not shown) for determining blade vibration in a known manner.

A sensor 34 which can be used in combination with the circuit 10 of FIG. 3 is illustrated in FIG. 5. The magnetic sensor 34 is a self-generating, variable-reluctance transducer which does not need a power supply. Such sensors are often used for measuring rotational speed by counting the teeth on a gear. Appropriate sensors are commercially available and can be obtained in a variety of configurations and package designs for particular applications.

The sensors used in combination with the present invention, have, for example, a very high strength magnet 36. The sensor housing 37 may be machined from a single piece of stainless steel bar stock, which is enclosed by EB welding to a special hermetically sealed connector 42. The magnet 36 operates in conjunction with a pole piece 38. A pick-up coil 40 produces a signal which is conducted by signal wires to the operational amplifier 12 of FIG. 3.

The internals of the sensor 34 should be suitable for operation at 550° F. (287.8° C.). Such sensors can be obtained from Airpax, a division of North American Phillips or Electro-Products.

The mounting of sensors, such as sensor 34, in a turbomachine is well known. See for example U.S. Pat. No. 4,573,358 issued March 4, 1986 to Luongo. Sensor to surface distances may be between 150 to 250 mils (0.0381 to 0.0635 mm) and surface speeds greater than 2,000 feet per second (609.6 meters per second).

The present invention is also directed to a method of detecting the passing of the blades of a rotating machine past a stationary sensor. The method includes the steps of producing an input signal each time a blade passes a stationary sensor. An output signal is produced each time the input signal crosses a reference axis. The input signal is phase-shifted to produce a phase-shifted input signal. The phase-shifted input signal is compared to a reference signal to produce a gating signal coinciding with the expected arrival time of the blade at the sensor. The output signal is selectively conducted in response to the gating signal.

In summary, the present invention is directed to an apparatus and method of coping with the low frequency response and spacing and velocity sensitivities of magnetic sensors. That is accomplished by providing a true zero-crossing detector shown in FIG. 3. By using the same input signal to produce not only the output pulses, but a gating signal to selectively conduct those output pulses, the effects of noise on the spurious generation of output signals is minimized. The magnetic sensors are inherently simple and rugged and can be built to tolerate conditions encountered in turbomachinery. The signals produced by the apparatus and method of the present invention can be used in a known manner to extract extensive vibrational information. In addition to blade vibration, blade passing time data may also be used to determine static deflection or the state of untwist of rotating blades.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. An apparatus for detecting the passing times of the blades of a steam turbine past a stationary sensor for providing blade vibration data, comprising:
    stationary magnetic sensor means for producing an input signal each time a blade of a steam turbine passes said sensor means;
    zero crossing detection means responsive to said input signal for producing an output signal each time said input signal crosses a reference axis;
    means responsive to said input signal for shifting the phase of said input signal;
    comparator means responsive to said phase shifted input signal and a reference signal for producing a gating signal whenever said phase shifted input signal exceeds said reference signal, said gating signal having a pulse width whose duration spans the expected arrival time of the blade at said sensor means; and
    gate means responsive to said gating signal and said output signals for conducting those output signals which occur during the duration of said gating signal, said conducted output signals being indicative of the times at which the steam turbine blades pass said sensor means and from which times blade vibration data may be obtained.

2. The apparatus of claim 1 wherein said means for shifting the phase of said input signal includes a phase shifter for shifting the phase of said input signal by ninety degrees.

3. The apparatus of claim 1 wherein said gate means includes a digital logic gate.

4. The apparatus of claim 3 wherein said logic gate includes a NOR gate.

5. The apparatus of claim 1 wherein said zero crossing detection means includes an operational amplifier for receiving said input signal at a first input terminal thereof and for receiving a reference signal at a second input terminal thereof, said output signal being available at an output terminal thereof.

6. Apparatus for precisely detecting the passing times of the blades of a steam turbine past a stationary sensor for providing blade vibration data, comprising:
    stationary magnetic sensor means for producing an input signal each time a blade of a steam turbine passes said sensor means;
    zero crossing detection means responsive to said input signal for producing an output pulse each time said input signal crosses a reference axis;
    means responsive to said input signal for shifting the phase of said input signal to produce a phase shifted input signal;
    means responsive to said phase shifted input signal for comparing said phase shifted input signal to a reference signal to produce a digital gating signal having a pulse width whose duration spans the expected arrival time of the blade at said sensor means; and
    gate means responsive to said output pulses and said gating signal for selectively conducting said output pulses in response to said gating signal, said conducted output pulses being indicative of the times at which the steam turbine blades pass said sensor means and from which times blade vibration data may be obtained.

7. A method of detecting the passing times of the blades of a steam turbine past a stationary sensor for producing a stream of blade passing time data from which blade vibration data may be extracted, comprising the steps of:
    producing an input signal each time a blade of a steam turbine passes a stationary magnetic sensor means;
    producing an output signal each time said input signal crosses a reference axis;
    shifting the phase of said input signal to produce a phase shifted input signal;
    comparing said phase shifted input signal to a reference signal to produce a gating signal having a pulse width whose duration spans the expected arrival time of the blade at said sensor means;
    selectively conducting said output signals in response to said gating signal such that the conducted output signals are indicative of the times at which the steam turbine blades pass said sensor means and from which times blade vibration data may be obtained.

* * * * *